United States Patent
Ilies et al.

(10) Patent No.: US 12,397,549 B2
(45) Date of Patent: Aug. 26, 2025

(54) ELECTROWETTING FOR DROP-ON-DEMAND METAL ADDITIVE MANUFACTURING

(71) Applicant: University of Connecticut, Farmington, CT (US)

(72) Inventors: Horea Ilies, Farmington, CT (US); Jiangce Chen, Farmington, CT (US)

(73) Assignee: University of Connecticut, Farmington, CT (US)

(*) Notice: Subject to any disclaimer, the term of this patent is extended or adjusted under 35 U.S.C. 154(b) by 232 days.

(21) Appl. No.: 18/329,376

(22) Filed: Jun. 5, 2023

(65) Prior Publication Data

US 2023/0391079 A1 Dec. 7, 2023

Related U.S. Application Data

(60) Provisional application No. 63/349,290, filed on Jun. 6, 2022.

(51) Int. Cl.
*B41J 2/14* (2006.01)
*B33Y 30/00* (2015.01)
*B33Y 50/02* (2015.01)

(52) U.S. Cl.
CPC ........... *B41J 2/14* (2013.01); *B33Y 30/00* (2014.12); *B33Y 50/02* (2014.12); *B41J 2002/14395* (2013.01)

(58) Field of Classification Search
CPC ...... B41J 2/14; B41J 2002/14395; B41J 2/04; B41J 2202/04; B33Y 30/00; B33Y 50/02; B33Y 10/00; B22F 10/22; B22F 10/85; B22F 12/53; Y02P 10/02
USPC .......................................................... 347/55
See application file for complete search history.

(56) References Cited

U.S. PATENT DOCUMENTS

| | | |
|---|---|---|
| 10,850,272 B2 | 12/2020 | Umapathi et al. |
| 10,969,350 B2 | 4/2021 | Ros et al. |
| 11,020,736 B2 | 6/2021 | Abate et al. |
| 11,167,288 B2 | 11/2021 | Gach et al. |
| 11,192,108 B2 | 12/2021 | Breinlinger et al. |
| 11,607,724 B2 | 3/2023 | Sukhotskiy et al. |

(Continued)

OTHER PUBLICATIONS

Berge, B. English Abstract of "Electrocapillarite et mouillage de films isolants par l'eau." Comptes Rendus de L'Academie des Sciences Paris, Serie, II 317 (1993): 157-163.

(Continued)

*Primary Examiner* — Jason S Uhlenhake
*Assistant Examiner* — Alexander D Shenderov
(74) *Attorney, Agent, or Firm* — Michael Best & Friedrich LLP (57) ABSTRACT

An apparatus for generating a droplet of a liquid metal material in a metal additive manufacturing process includes a nozzle configured to eject the droplet of the liquid metal material, the nozzle including a conductive solid. The apparatus also includes a voltage source configured to apply voltage between the conductive solid and the liquid metal material to modify a contact angle between an inner wall of the nozzle and the liquid metal material within the nozzle. The apparatus also includes a controller configured to modify the voltage from the voltage source to modify the contact angle and generate the droplet of the liquid metal material.

13 Claims, 12 Drawing Sheets

(56) References Cited

U.S. PATENT DOCUMENTS

| | | | |
|---|---|---|---|
| 2005/0116069 A1* | 6/2005 | Murata | B41J 2/04 239/690 |
| 2010/0024725 A1 | 2/2010 | Lennon et al. | |
| 2013/0284956 A1* | 10/2013 | Kwon | F16K 99/0051 251/65 |
| 2014/0322451 A1* | 10/2014 | Barton | B41J 2/06 427/466 |
| 2015/0273577 A1 | 10/2015 | Vader et al. | |
| 2017/0087632 A1* | 3/2017 | Mark | B22D 27/003 |

OTHER PUBLICATIONS

Christopher, G. F. et al. "Microfluidic methods for generating continuous droplet streams." Journal of Physics D: Applied Physics 40.19 (2007): R319.

Eaker, C. B., et al. "Liquid metal actuation by electrical control of interfacial tension." Applied Physics Reviews 3.3 (2016): 031103.

Gilani, N., et al. "Insights into drop-on-demand metal additive manufacturing through an integrated experimental and computational study." Additive Manufacturing 48 (2021): 102402.

Gu, H. et al. "Droplets formation and merging in two-phase flow microfluidics." International Journal of molecular sciences 12.4 (2011): 2572-2597.

Gu, Hao, et al. "Electrowetting-enhanced microfluidic device for drop generation." Applied Physics Letters 93.18 (2008): 183507.

He, B., et al. "The roles of wettability and surface tension in droplet formation during inkjet printing." Scientific reports 7.1 (2017): 11841.

Jakeway, S. C., et al. "Miniaturized total analysis systems for biological analysis." Fresenius' journal of analytical chemistry 366 (2000): 525-539.

Jiang, Y., et al. "Electrowetting-assisted direct ink writing for low-viscosity liquids." Journal of Manufacturing Processes 69 (2021): 173-180.

Lippmann G. et al. Relations entre les ph'enom'enes 'electriques et capillaires. PhD thesis, Gauthier-Villars Paris, France, 1875.

Malloggi, F., et al. "Electrowetting—A versatile tool for controlling microdrop generation." The European Physical Journal E 26 (2008): 91-96.

Merdasi, A. et al. "Electrowetting induced droplet generation in T-junctions." Journal of Heat Transfer 143.5 (2021): 052103.

Mugele, F. et al. "Electrowetting: from basics to applications." Journal of physics: condensed matter 17.28 (2005): R705.

Murr, L. E. et al. "3D metal droplet printing development and advanced materials additive manufacturing." Journal of Materials Research and Technology 6.1 (2017): 77-89.

Orme, M. et al. "Molten aluminum micro-droplet formation and deposition for advanced manufacturing applications." Aluminum Transactions 3.1 (2000): 95-103.

Plog, J., et al. "Control of direct written ink droplets using electrowetting." Langmuir 35.34 (2019): 11023-11036.

Plog, J., et al. "Drop Manipulation by Electrowetting for 3D Printing." APS Division of Fluid Dynamics Meeting Abstracts. 2019.

Sukhotskiy, V. et al. "Magnetohydrodynamic drop-on-demand liquid metal 3D printing." 2017 International Solid Freeform Fabrication Symposium. University of Texas at Austin, 2017.

Wan, Z. et al. "Reversible electrowetting of liquid-metal droplet." (2007): 388-394.

Watson, A.M. et al. "Electrowetting-assisted selective printing of liquid metal." Advanced Engineering Materials 21.10 (2019): 1900397.

Watson, A. M., et al. "Focus-tunable low-power electrowetting lenses with thin parylene films." Applied optics 54.20 (2015): 6224-6229.

Yarin, A. L. "Wetting for self-healing and electrowetting for additive manufacturing." Current Opinion in Colloid & Interface Science 51 (2021): 101378.

Zhong, S.-Y., et al. "Effect of process parameters on copper droplet ejecting by pneumatic drop-on-demand technology." Journal of materials processing technology 214.12 (2014): 3089-3097.

* cited by examiner

ELECTROWETTING FOR DROP-ON-DEMAND METAL ADDITIVE MANUFACTURING

CROSS-REFERENCE TO RELATED APPLICATIONS

This application is filed under 37 CFR § 1.53(b) and under 35 U.S.C. § 119(e) claims the benefit of prior filed U.S. Provisional Application No. 63/349,290, filed Jun. 6, 2022, and entitled "Method of Electrowetting for Drop-On-Demand Metal Additive Manufacturing." The disclosure of which is incorporated herein by reference.

FIELD OF THE INVENTION

The present invention relates to systems and methods of additive manufacturing systems. More particularly, the present invention relates to metal additive manufacturing (MAM), such as "drop-on-demand" metal additive manufacturing.

DESCRIPTION OF THE RELATED ART

Metal additive manufacturing (MAM) is a manufacturing technology that builds metallic components accumulatively in a layer-by-layer manner. Compared to traditional subtractive manufacturing, MAM has increased capabilities in fabricating complex structures efficiently in terms of material and time cost. Multiple different MAM technologies and manufacturing methods exist. One method includes depositing solid material in planned positions, including wire and powders, then coalescing the material through heating or by depositing a binder, such as Directed Energy Deposition (DED), Laser Powder Bed Fusion (L-PBF), and Binder Jetting Process. Another example of a MAM method is to directly eject liquid metal such that the metal is coalesced as it cools down and solidifies. The liquid metal may be ejected as either a continuous stream or in discrete drops. Drop-on-demand (DOD) MAM is a liquid metal jetting technology that ejects well-formed droplets out of a nozzle in a periodic or aperiodic controlled manner. DOD MAM generates manufacturing of complex metallic components with single or multiple materials. DOD MAM technology uses a droplet generation mechanism that forms the liquid metal droplet. Some droplet generation mechanisms generate the droplets by driving pressure waves that push droplets out of an orifice of the mechanism. Various sources of the actuation force for ejecting the droplets may be used, including but not limited to pneumatic, piezoelectric, and/or Magneto-Hydro-Dynamic. Current DOD MAM systems face difficulties such as the vibration of the droplet that is induced by the ejection of the droplet, the fatigue of the nozzle through which the droplet is ejected (i.e., caused by extended use, high temperatures), and periodic loading conditions that may modify the operating characteristics of the DOD MAM apparatus.

Thus, there is a need for improvements to drop-on-demand techniques for metal-additive-manufacturing (MAM).

Figure 1:
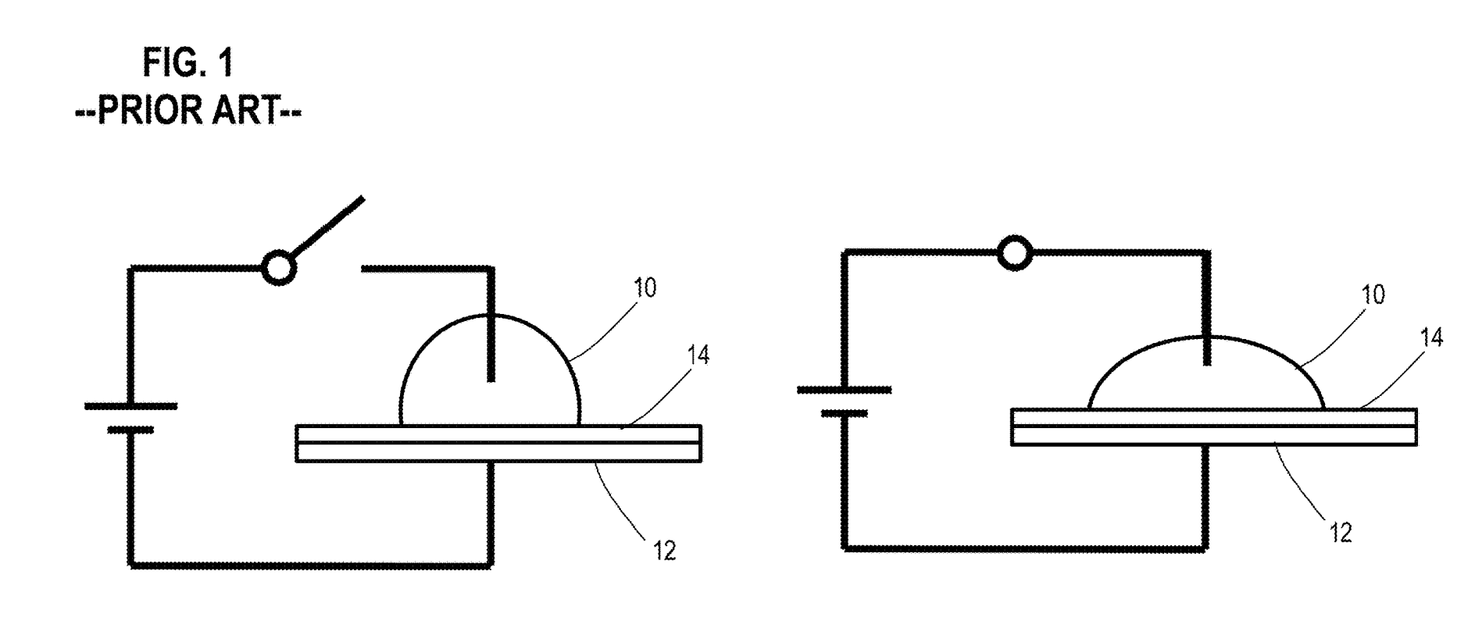
FIG. 1 schematically illustrates the process of electrowetting-on-dielectric (EWOD) according to the prior art.

Electrowetting-on-Dielectric (EWOD) is illustrated in FIG. 1. A parallel plate capacity is formed between a droplet 10 and an electrode. In some embodiments, the droplet 10 is formed on a substrate 12 with an isolator 14 located therebetween. To increase the energy stored in the capacity, the droplet is forced to spread, resulting in a decrease in effective interfacial energy.

SUMMARY

In one embodiment, the invention provides an apparatus for generating a droplet of a liquid metal material in a metal additive manufacturing process. The apparatus includes a nozzle configured to eject the droplet of the liquid metal material, the nozzle including a conductive solid, a voltage source configured to apply voltage between the conductive solid and the liquid metal material to modify a contact angle between an inner wall of the nozzle and the liquid metal material within the nozzle, and a controller configured to modify the voltage from the voltage source to modify the contact angle and generate the droplet of the liquid metal material.

In another embodiment, the invention provides a computer-based system for generating a droplet of a liquid metal material in a metal additive manufacturing process. The computer-based system includes an electronic controller configured to maintain the liquid metal material within a nozzle at a stable contact angle and modify the contact angle between an inner wall of the nozzle and the liquid metal material within the nozzle to move the liquid metal material out of the nozzle and generate the droplet of liquid metal material.

In another embodiment, the invention provides An apparatus for generating a droplet of a liquid metal material in a metal additive manufacturing process. The apparatus includes a nozzle configured to eject the droplet of the liquid metal material, a voltage source configured to apply voltage between a conductive solid and the liquid metal material to modify a contact angle between an inner wall of the nozzle and the liquid metal material within the nozzle, and a controller configured to modify the voltage from the voltage source to modify the contact angle and generate the droplet of the liquid metal material without applying an actuation force.

Other aspects of the invention will become apparent by consideration of the detailed description and accompanying drawings.

DETAILED DESCRIPTION

Disclosed herein are apparatus and methods for metal-additive-manufacturing (MAM). Generally, the techniques disclosed enable application of droplet sized additions of metallic material to a workpiece through "electrowetting-on-dielectric" (EWOD) techniques. The techniques disclosed provide various advantages over the prior art, resulting in technical effects including decreased stress on the nozzle, thereby increasing the lifespan of the nozzle. Additionally, the generated droplets experience less vibrations, resulting in increased accuracy of placement of the droplets. Further still, the techniques used herein allow for miniaturization of the print head assembly, which additionally allows for a tighter cluster of multiple nozzles.

In order to provide some context for the teachings herein, some aspects are now introduced.

Generally, metal-additive-manufacturing (MAM), which may be referred to as "metal 3D printing" involves making a three-dimensional object from a computer-generated model. A variety of techniques may be used for deposition of metal or metal forming material. One class of techniques includes material jetting, or "drop-on-demand." Using a continuous or drop-on-demand (DOD) method, material is jetted onto a platform, forming a first layer. The material solidifies and another layer is then printed on to the first layer. The process is repeated until the intended object has been realized.

Metallic materials (i.e., metals) that may be used in drop-on-demand (DOD) metal-additive-manufacturing (MAM) include, for example, various alloys of steel or stainless steel, titanium, gold, silver and others. In some embodiments, conductive thermoplastics may be applied.

Generally, the techniques disclosed make use of apparatuses similar to an inkjet printer. Inkjet printing quality is related to a number of factors, such as geometry of the nozzle that ejects the ink, materials used to construct the nozzle, properties of the materials used for printing, and actuating conditions. Two important factors are wettability of the nozzle and surface tension of the ink. These factors play important roles in the formation of the droplet. Wettability of the nozzle has a significant effect on formation, velocity and shape of the droplets.

Wettability and surface tension have significant impacts on droplet formation during DOD processes. For example, decreasing the wettability of the inner wall of the nozzle, that is increasing the contact angle $\theta_Y$ (FIG. 2), delays the droplet breakup time and reduces the droplet velocity, while higher surface tension results in earlier droplet breakup and faster drop velocity. Therefore, modifying the contact angle $\theta_Y$ plays a significant role in the formation of the droplet. The contact angle $\theta_Y$ is described in greater detail below with respect to FIG. 2.

Electrowetting-on-Dielectric (EWOD) increases the wettability of a surface by applying an electric field between a conductive liquid 20 and a dielectric substrate 30. In some embodiments, the substrate 30 includes an isolator 24 and an underlying substrate 22 such that the isolator 24 is located between the substrate 22 and the droplet 20. As described in greater detail below, electrowetting influences the formation of droplets 20 in a drop-on-demand 3D printing process. The novel apparatus is a droplet ejection mechanism described below that solely depends on electrowetting (EW) without actuation force, which improves the stability of droplet formation through the orifice of the DOD ejection mechanism. In addition, the simplified structure of the ejection mechanism can include a cluster of closely packed printing heads, which accelerates the printing process by controlling the printing heads individually and simultaneously.

Figure 2:
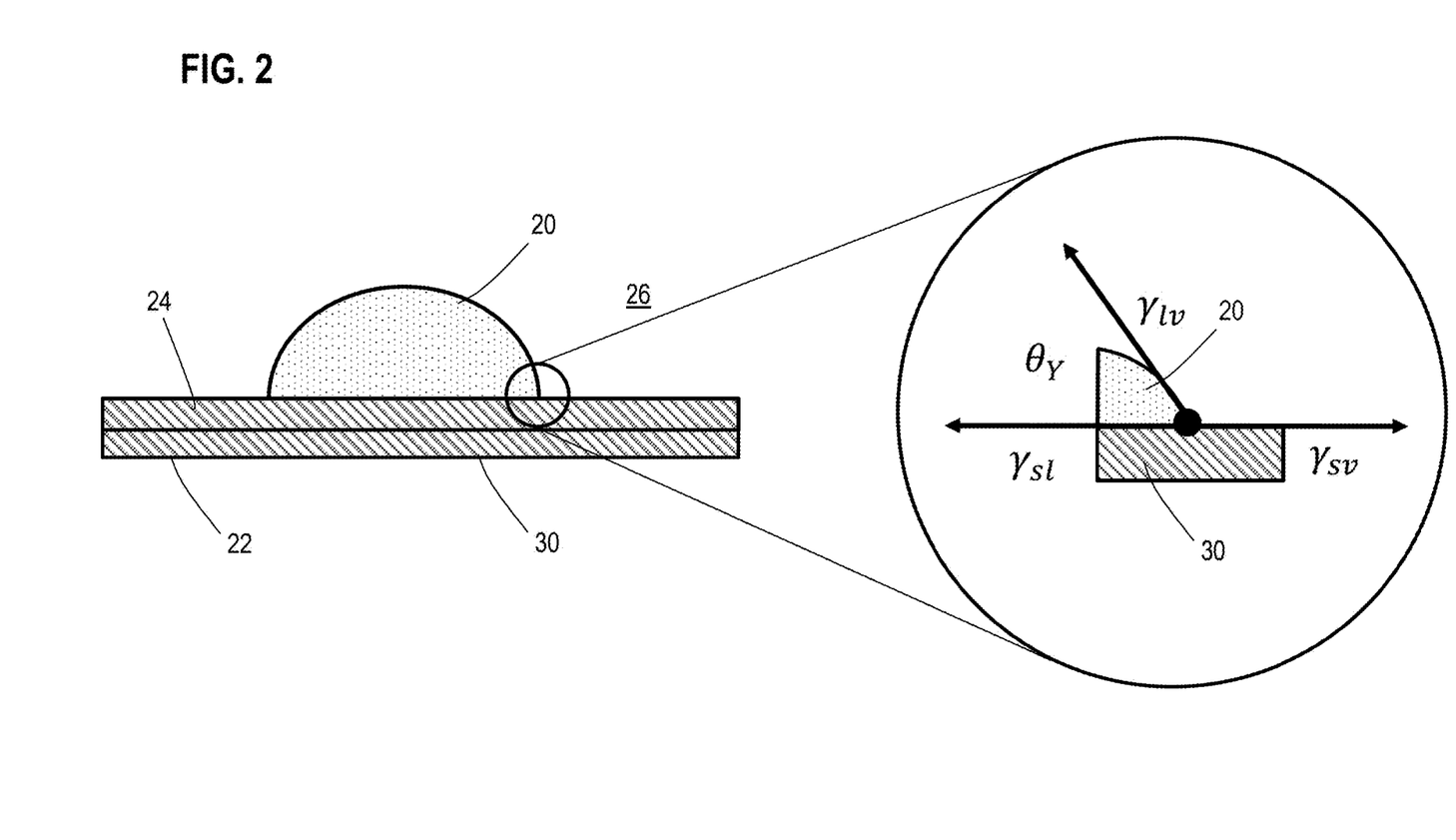
FIG. 2 schematically illustrates the contact angle of a liquid meniscus.

With continued reference to FIG. 2, in the droplet system, there are three kinds of material or phases, including a liquid material (including aqueous solutions, mixtures and/or suspensions such as metallic powder suspended in a binder or solvent etc.) 20, a vapor material 26, and a solid material 30. The interfacial tensions at the interface are denoted as $\gamma_{lv}$, $\gamma_{sl}$, $\gamma_{sv}$. The liquid material 20 in the DOD ejection mechanism is material being printed. The solid material 30 in the DOD ejection mechanism is the nozzle that ejects the material being printed. The vapor material 26 in the DOD ejection mechanism is the atmosphere around the printer. The curve that locates the interaction of the three phases is called the three-phase contact line (TCL). Under static assumptions, the equilibrium force at TCL gives rise to Young's equation (Equation 1):

$$\cos\theta_Y = \frac{\gamma_{sv} + \gamma_{sl}}{\gamma_{lv}} \qquad (1)$$

where $\theta_Y$ is the contact angle. FIG. 2 illustrates how the contact angle is caused by force equilibrium. The contact angle also plays the role of boundary condition in the formation of the meniscus shape. The process of electrowetting modifies the droplet by changing the contact angle, which is described by Equation 2:

$$\cos\theta = \cos\theta_Y + \frac{\epsilon_0 \epsilon_d}{2d_H \gamma_{lv}} U^2 = \cos\theta_Y + \eta \qquad (2)$$

where $\epsilon_0$ is the permittivity of free space, $\epsilon_d$ is the dielectric constant, $d_H$ is the thickness of the Helmholtz layer, and U is the applied voltage.

Figure 3:
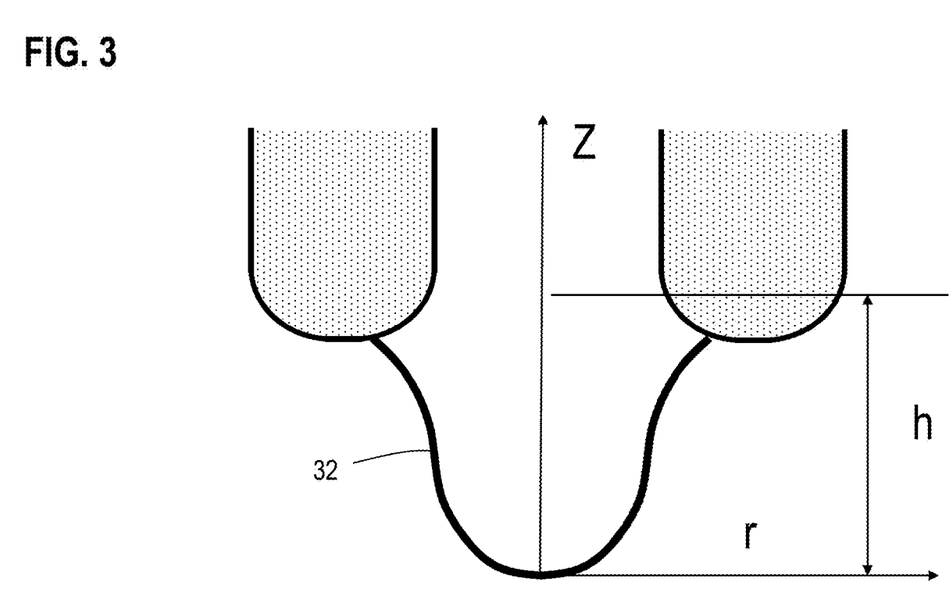
FIG. 3 schematically illustrates a simplified illustration of a pendent drop.

The following equations define how the meniscus of a pendent droplet is formed. FIG. 3 shows a simplified illustration of a pendent drop 32. The shape of the meniscus is denoted as $r(z, \phi)$. The free energy of the system is:

$$F = A_{sv}\gamma_{sv} + A_{sl}\gamma_{sl} + A_{lv}\gamma_{lv} p_0 V - W_g \qquad (3)$$

where $p_0$ is the pressure at the reference plane z=h. $W_g$ is the energy worked by gravity:

$$W_g \int \Delta \rho gz dv \qquad (4)$$

where $\Delta\rho$ is the density difference between the liquid phase and the vapor phase. The free energy F is a functional of $r(z, \phi)$. Since $\gamma_{lv}$ is much larger $\gamma_{sv}$, we can neglect the $A_{sv}\gamma_{sv}$ term in Equation 3. Further, with the assumption that the motion of TCL is very small, we can neglect $A_{sl}\gamma_{sl}$. As such, the simplified free energy shortens to:

$$F = A_{lv}\gamma_{lv} - (p_0 V + W_g) \quad (5)$$

From Equation 5, we can see how a stable meniscus is formed in the DOD ejection mechanism. As the pressure $p_0$ increases, more liquid metal material 20 is pushed out of the orifice and enters the meniscus, increasing the area of the meniscus $A_{lv}$ and increasing the work done by $p_0$ and gravity. The shape of the meniscus is stable at the point where the increase in $A_{lv}\gamma_{lv}$ does not exceed the increase in $p_0 V + W_g$. Variational minimization of Equation 3 leads to the Laplace equation:

$$\Delta p = \gamma_{lv}\left(\frac{1}{R1} + \frac{1}{R2}\right) \quad (6)$$

where $\Delta p = p0 + (\Delta p)gz$, and R1 and R2 are the two principal radii of curvature. The shape of the meniscus is determined by Equations 1 and 6. As such, the contact angle plays a significant role in the form of the meniscus. By modifying the contact angle via EWOD, as described in Equation 2, the shape of the meniscus is modified and even the state of the droplet can be changed from static to dynamic.

Figure 4:
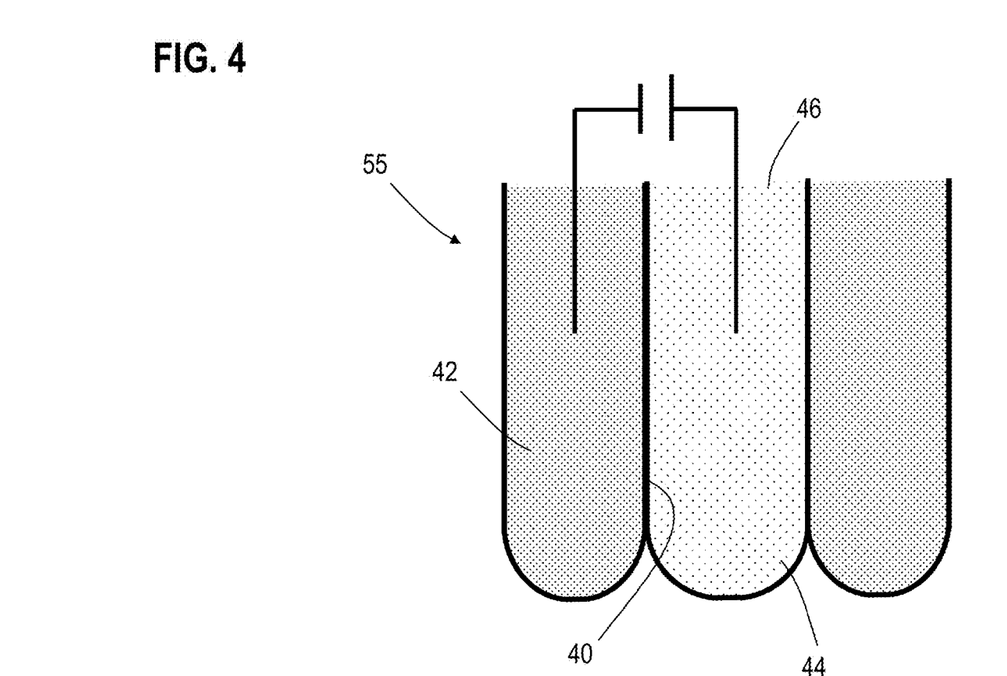
FIG. 4 schematically illustrates a pendant drop with an electrowetting-on-dielectric (EWOD) apparatus.
Figure 5:
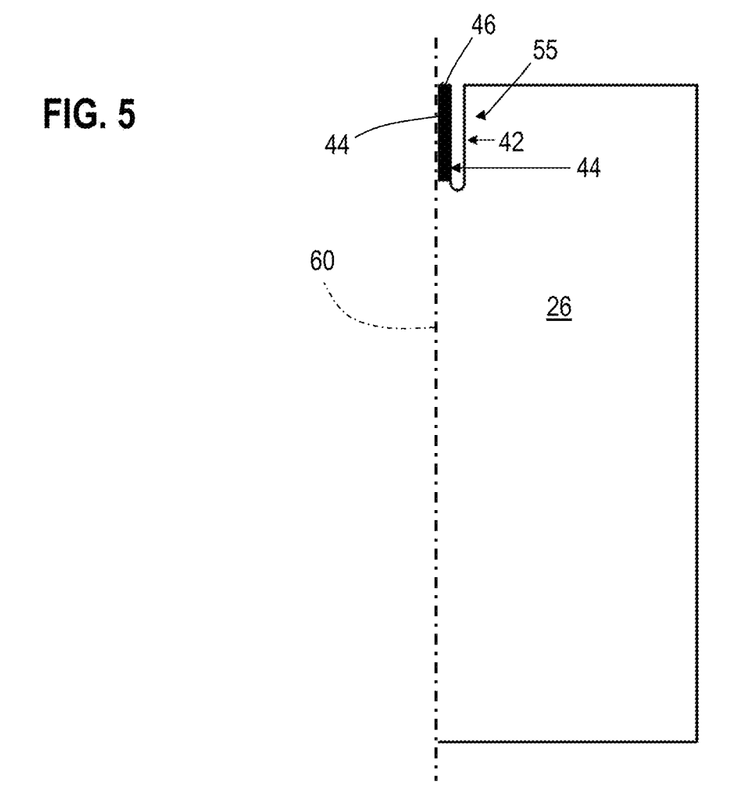
FIG. 5 illustrates a 2D asymmetric model of the pendant drop for an EWOD model.
Figure 6A:
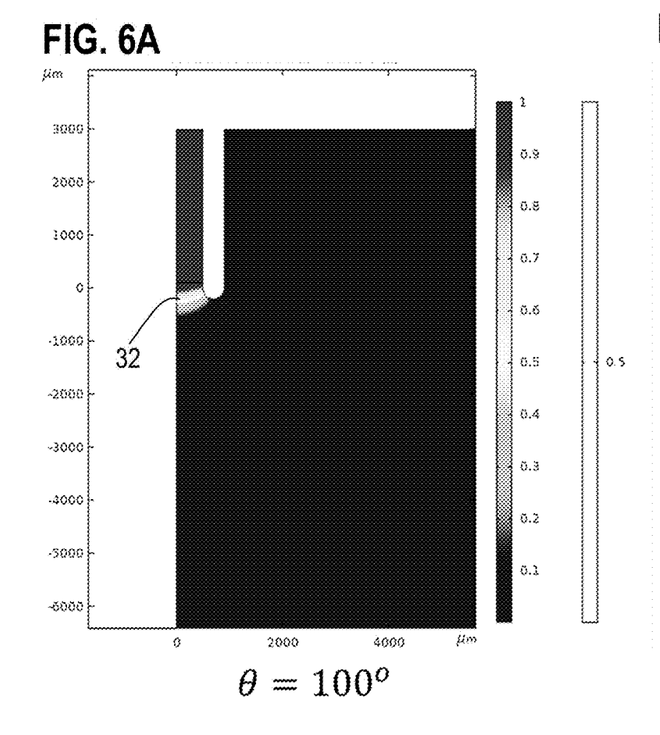
FIG. 6A illustrates the stability of a meniscus at a first contact angle in the model of FIG. 5.
Figure 6B:
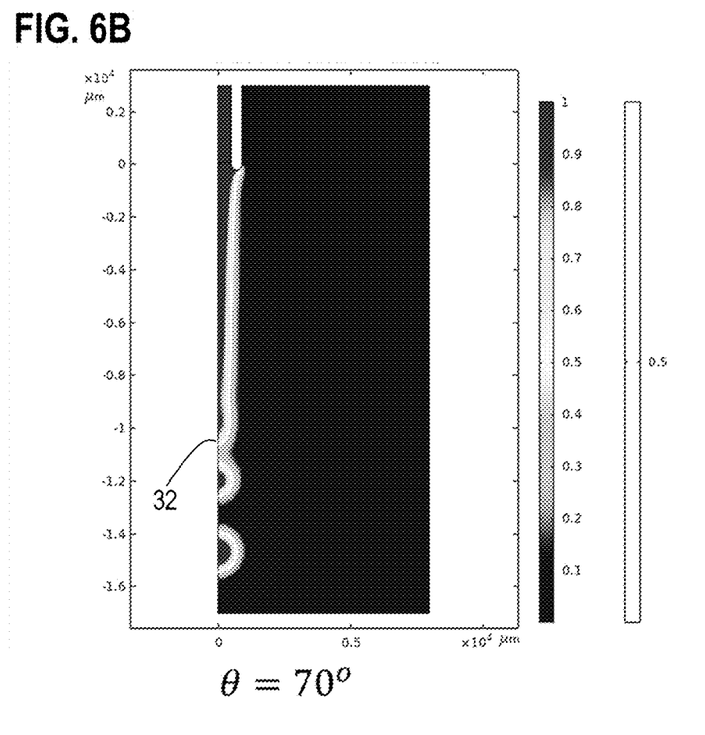
FIG. 6B illustrates the stability of a meniscus at a second contact angle in the model of FIG. 5.

FIG. 4 illustrates the novel concept of an EWOD activated droplet. The inner wall 40 of the nozzle 55 is coated with a thin layer of dielectric material. The outer wall 42 is made of conductive solid such as copper, aluminum, steel, and alloys of the same. Voltage is added between the liquid 44 (within the nozzle 55) and the conductive solid of the outer wall 42. Constant pressure is added at the inlet 46 of the nozzle 55, which generates a pendent meniscus. By tuning the voltage, the contact angle is changed, as illustrated by FIGS. 5-6B. In some embodiments, the voltage applied is less than 200 volts.

A 2D axisymmetric model is illustrated in FIG. 5. The model includes an axis of symmetry 60 on the left of the figure. Two fluids 44, 26 are included in the model with the liquid 44 within the nozzle 55 located adjacent to the inlet 46 and the wetted wall. Air is the second fluid and fills the remainder of the model.

The liquid 44 flows into the domain of the model from the inlet at the upper boundary of the nozzle 55. The physics module used in the simulation is a two-phase laminar flow. The interface between the two phases is captured by a phase field method.

The liquid metal 44 used in the simulation is mercury, though other materials such as aluminum or an aluminum alloy could otherwise be used. Based on the results of the simulation, the contact angle of mercury can be changed between 70 degrees and 140 degrees.

To illustrate the influence of contact angle, FIGS. 6A and 6B show the status of the meniscus at the same pressure but at different contact angles. As shown in FIG. 6A, the pendent droplet 32 is stable when the contact angle is 100 degrees. As shown in FIG. 6B, the pendent droplet 32 is unstable when the contact angle is 70 degrees. This simulation identifies that solely modifying the contact angle can modify the status of the pendent droplet.

Figure 7:
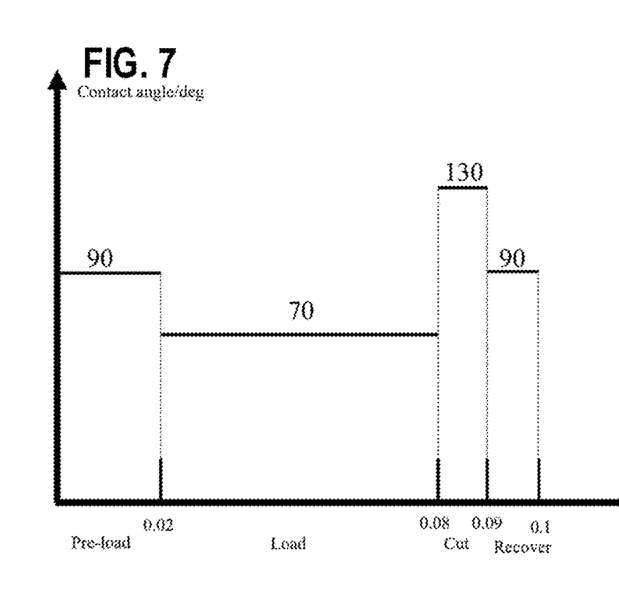
FIG. 7 is a plot of time vs. contact angle in a method of modifying the contact angle to generate a droplet in the model of FIG. 5.
Figure 8:
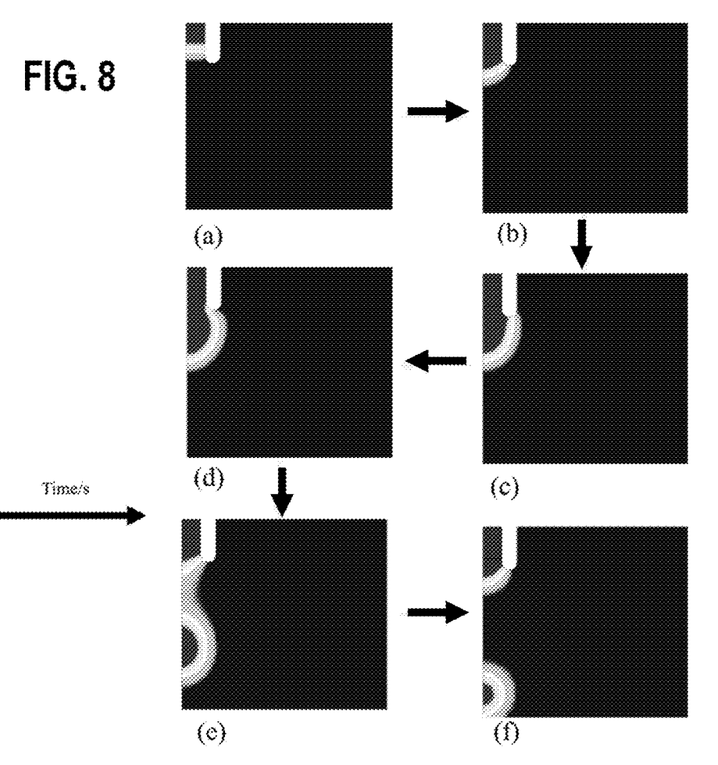
FIG. 8 illustrates various snapshots at the different times illustrated in the plot of FIG. 7.

FIGS. 7-8 illustrate a method that generates a droplet through manipulating the contact angle. As shown in the Time (s) vs. Contact Angle (degrees) plot of FIG. 7, the control process is divided into four stages. The first stage is a pre-load stage, from 0 to 0.02 s, corresponding with snapshots (a) to (b) of FIG. 8. The pendent droplet is stable at a 90 degree contact angle. The second stage is a load stage, from 0.02-0.08 s, corresponding with snapshots (b) to (c) of FIG. 8. The contact angle is reduced to 70 degrees at the load stage, which spreads the liquid, increasing the amount of liquid metal that is moved out of the nozzle. At the end of the load stage, the pendent droplet is loaded with more liquid than at the beginning of the stage as shown in snapshot (c) of FIG. 8. The third stage is the cut stage, from 0.08-0.09 s, corresponding with snapshots (d) to (e) of FIG. 8. The contact angle at this stage is increased to 130 degrees, thereby decreasing the wettability of the wall. The three-phase contact line is contracted, and a part of the liquid is "squeezed" out of the nozzle. The fourth stage is the recover stage, from 0.09-0.1 s, corresponding with snapshots (e) to (f) of FIG. 8. The meniscus of the pendent droplet recovers back to its stable shape, which is same as snapshot (b) of FIG. 8. The cycle then repeats and another round of droplet generation begin from snapshot (b). Modifying the contact angle to generate the droplet includes modifying the contact angle for a time duration between 0.01-0.0 seconds, for example 0.05-0.15 seconds, or approximately 0.10 seconds.

Figure 9:
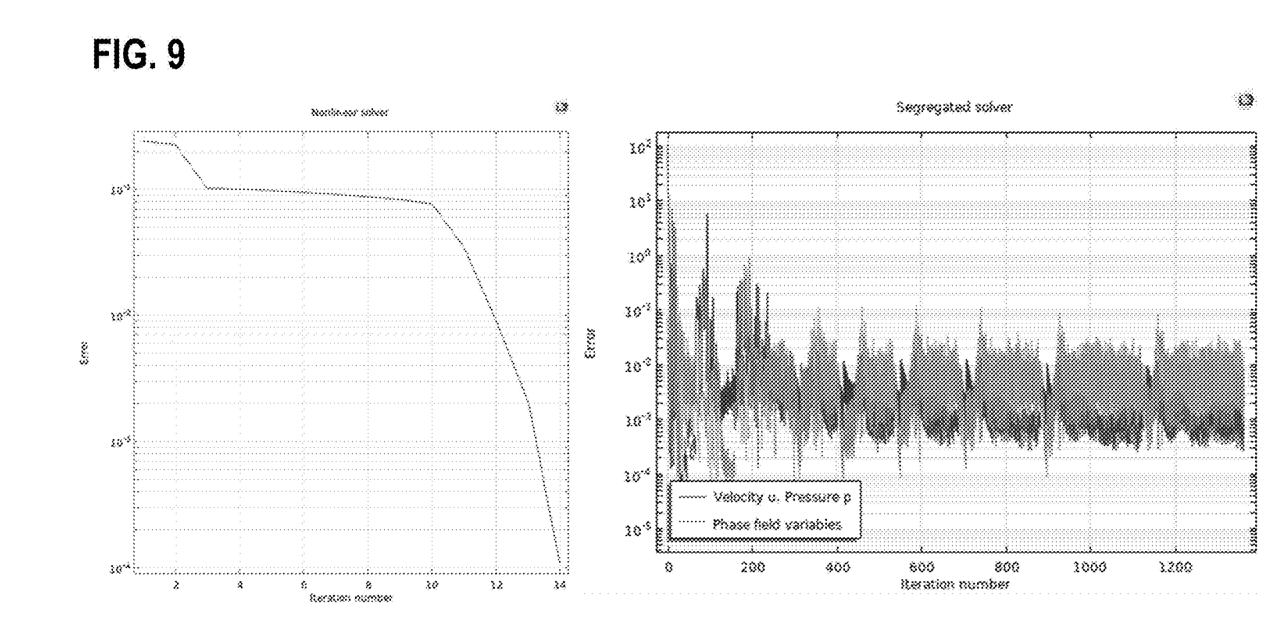
FIG. 9 illustrates the error of the droplets simulation across multiple iterations according to the model of FIG. 5.

FIG. 9 illustrates the convergence analysis during the simulation. As shown, the errors of the convergence analysis in the formulated droplet are minimized, illustrating the validity of the simulation. This heuristic approach demonstrates that a droplet is generated by sole manipulation of contact angle through EW without an actuation force. Dependent upon the specific material being used, various design variables can be adjusted to further modify (e.g., increase, decrease) the ejection frequency and droplet size. For example, the pressure on the inlet, the orifice radius, the syringe thickness, the load time and the cut time can be modified to generate droplets of different sizes and to modify the rate of droplet generation. The values of the design variables utilized in the example illustrated in FIGS. 7-8 are listed in Table 1.

TABLE 1

| Value of Design Variables | |
|---|---|
| Pressure | 1300 Pa |
| Orifice Radius | 500 um |
| Syringe Thickness | 400 um |
| Load Time | 0.06 s |
| Cut Time | 0.01 s |

The effects of electrowetting on drop-on-demand metal additive manufacturing show that it is possible to eject a droplet under constant exterior pressure by manipulating the contact angle through electrowetting. The configuration has a simplified structure and decreased vibrations relative to the prior art droplet ejection mechanism. Further, the method shown and described above can be utilized in a variety of different droplet ejection mechanisms and printing systems, as described below with respect to FIGS. 10-13. The method shown functions with increased reliability over prior art nozzle heads. Different droplet ejection mechanisms can include, in some embodiments, a droplet ejection mechanism that utilizes a cluster of printing heads, where each printing head could be controlled individually.

Printing systems 100, 200, 300, 400, such as those shown in FIGS. 10-13 may be used to perform the methods described with respect to FIGS. 2-9. With respect to FIG. 10, a print head assembly 150 is mounted to a track 130 over a substrate 120. In some embodiments, the track 130 is a fixed track positioned over a movable substrate 120 with the substrate being movable on a substrate carrier 125 in one, two, or three of the x, y, and z axes by a motion system (e.g., located within the base). In some embodiments, the motion precision system uses stepper motors to control the position of the substrate carrier 125 and the substrate 120 located thereon with respect to a device base. In other embodiments, the track 130 is a movable track and the substrate 120 is a stationary substrate such that the mint head assembly 150 is movable relative to the substrate 120 in one, two, or three of the x, y, and z axes by a motion system, such as stepper motors. In still further embodiments, each of the track 130 and the substrate 120 may be movable, with the track 130 movable in one, two, or three of the x, y, and z axes and the substrate movable in one, two, or three of the x, y, and z axes.

Figure 10:
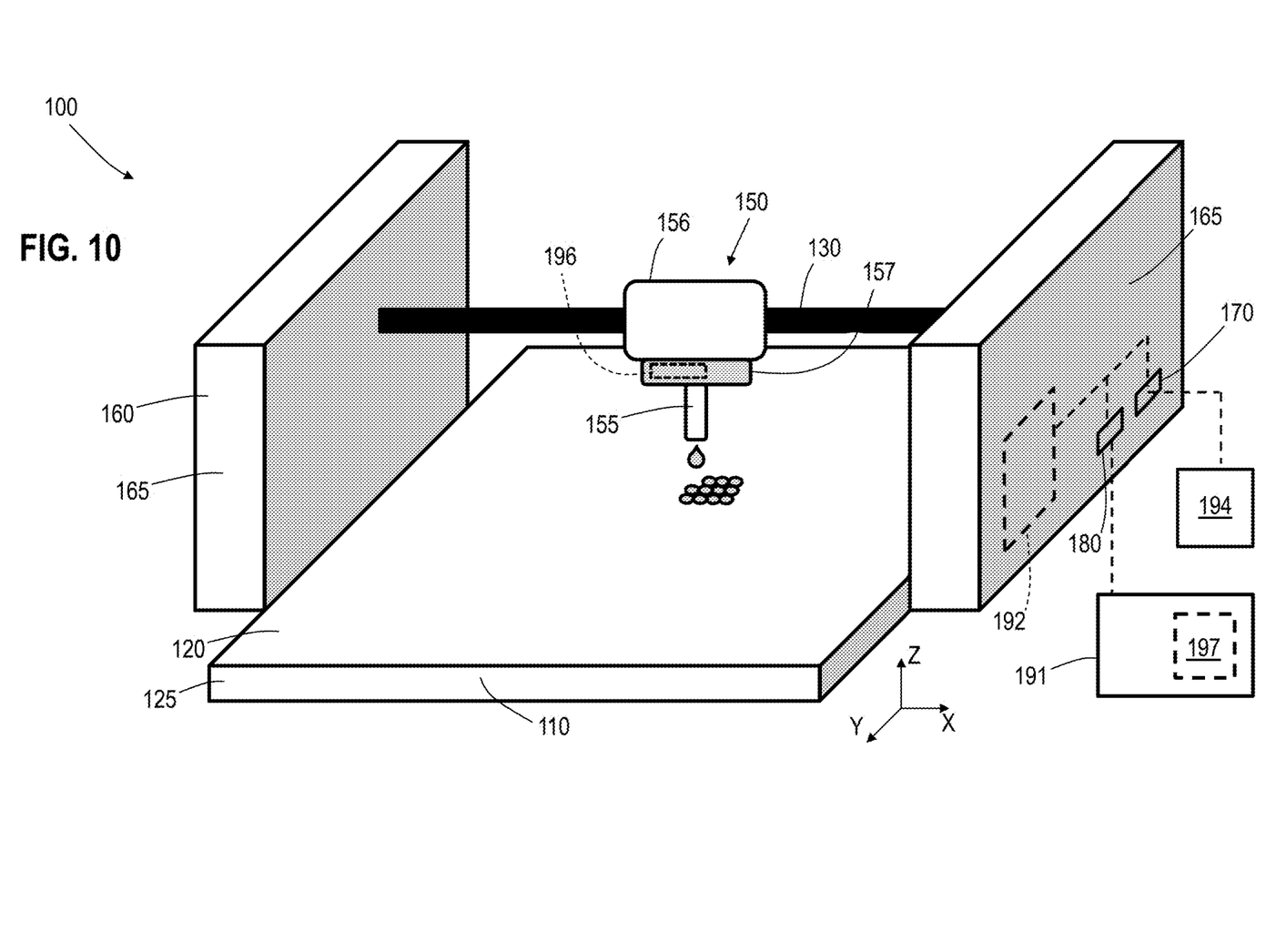
FIG. 10 illustrates an EWOD apparatus according to one embodiment, the EWOD apparatus including a metal 3D printer with a position control system, a nozzle, and a planar platform.

The substrate 120 can be any suitable receiving surface for the deposited material. Suitable substrates include but are not limited to flexible substrates such as polyester or polyvinyl alcohol films and coated papers. The substrate 120 may be constrained to the substrate carrier 125 by fasteners such as threaded fasteners, adhesive, or suction. In some embodiments, the substrate 120 is planar (e.g., extending in an X-Y plane). In other embodiments, the substrate is non-planar (e.g., curved or otherwise not confined to a single plane).

The printing system 100 has a print device housing 160 having two units 165 fixed to opposite sides of a device base 110. The print device housing 160 physically supports the track 130 on which the print head assembly 150 is mounted. The housing 160 and/or the print head assembly 150 also contains a print head assembly controller 196 which sends electrical signals to a nozzle(s) 155 of the print head assembly 150. These signals control the individual nozzles 155 that are to generate droplets (i.e., dispense material) via the mint head assembly 150. In some arrangements, the print head assembly 150 does not move along the track 130. Instead, the motion system moves the substrate carrier 125 to be positioned at the correct (x, y, location under the print head assembly 150. In other embodiments, the track 130 is movable relative to the housing 160 and/or the substrate 120 and the print head assembly 150 may be further movable along the track 130.

The print head assembly 150 includes the nozzle 155 for dispensing a liquid metal material, a liquid metal container 156 for storing the liquid metal material prior to dispensing the material, a voltage source 157, and the print head assembly controller 196. As described in greater detail with respect to FIGS. 2-9, the print head assembly controller 196 provides a signal to the voltage source 157 to generate a voltage that dispenses liquid metal material at a controlled rate from the container 156, through the nozzle 155 and onto a predetermined location on the substrate 120.

In some embodiments, the printing system 100 includes a power source connection 170 to provide power to the printing system via a power source 194. Further, the printing system 100 may include a data connection 180 (e.g., Universal Serial Bus (USB) port) for data transfer. Driving software 197 may be located on a computer 191, which can communicate with a device controller 192 directly using the USB connection 180. In alternative arrangements, the driving software located on a computer 191 may communicate with the device controller 192 via a parallel port or an Ethernet network connection. The device controller 192 is located in the device base 110. The device controller 192 communicates directly with the print head assembly controller 1% and the controls the motion system. In turn, the print head assembly controller 196 communicates with the print head assembly 150, and the motion system communicates with the substrate carrier 125. The printing system may additionally include a switch for turning the device on and off.

The computer 191 in which the driving software operates may be specially constructed for the required purposes or may comprise a general purpose computer or other device selectively activated or reconfigured by a computer program stored in the computer. The algorithms and displays presented herein are not inherently related to any particular computer or other apparatus. The computer program running on the computer 191 may be stored on any computer readable medium, including storage devices such as magnetic or optical disks, memory chips, or other storage devices suitable for interfacing with a general purpose computer. The computer readable medium may also include a hard-wired medium such as exemplified in the Internet system, or wireless medium.

Figure 11:
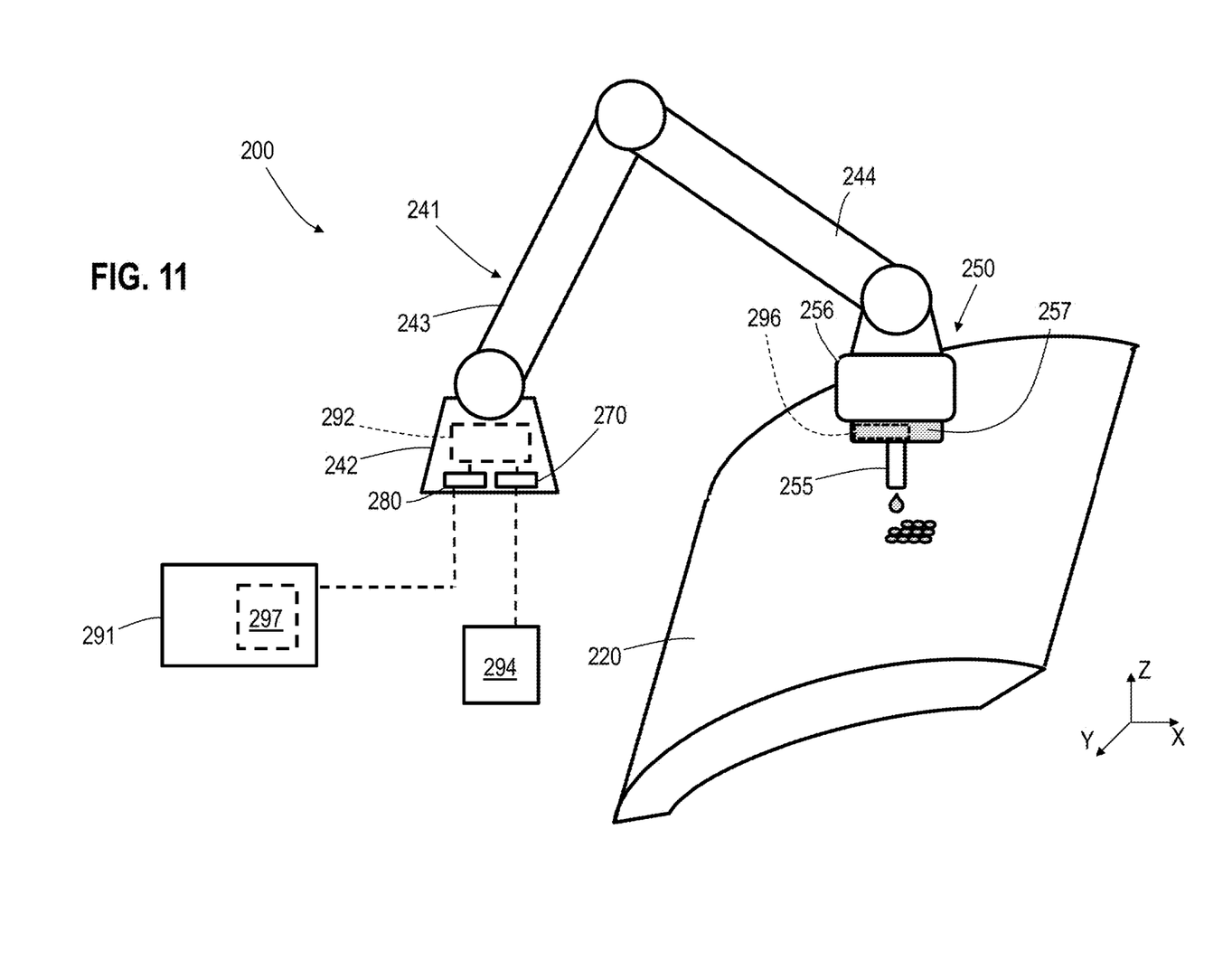
FIG. 11 illustrates an EWOD apparatus according to another embodiment, the EWOD apparatus including a metal 3D printer with a 6 degree-of-freedom (DOF) robotic arm, a nozzle, and a platform that may be planar or non-planar.

The printing system 200 of FIG. 11 is similar to the printing system 100 except as otherwise described. Similar elements are described with similar reference numerals incremented by 100. Rather than being supported on a track 130 as shown in FIG. 10, the print head assembly 250 is mounted to an end of a robotic arm 241. The robotic arm includes a stationary base 242, a first arm portion 243 coupled to the base 242, a second arm portion 244 coupled to the first arm portion 243 at a first end and coupled to the print head assembly 250 at the second end, opposite the first end. The connections between the base 242, arms 243, 244, and print head assembly 250 permit relative rotation at the joints therebetween. In some embodiments, the robotic arm 241 is a six degree-of-freedom robotic arm, allowing for translation and rotation in each of the X, Y, and Z axes. As described above with respect to FIG. 10, the substrate 220 onto which the nozzle 255 places the droplets can be planar or non-planar and is non-planar in the embodiment illustrated in FIG. 11. The function of the print head assembly 250 to generate droplets on demand by EWOD is similar to the print head assembly 150 of FIG. 10. The printing system 200 primarily differs from the printing system 100 of FIG. 10 by utilizing an alternative arrangement for moving the print head assembly 250 relative to the substrate 220.

Figure 12:
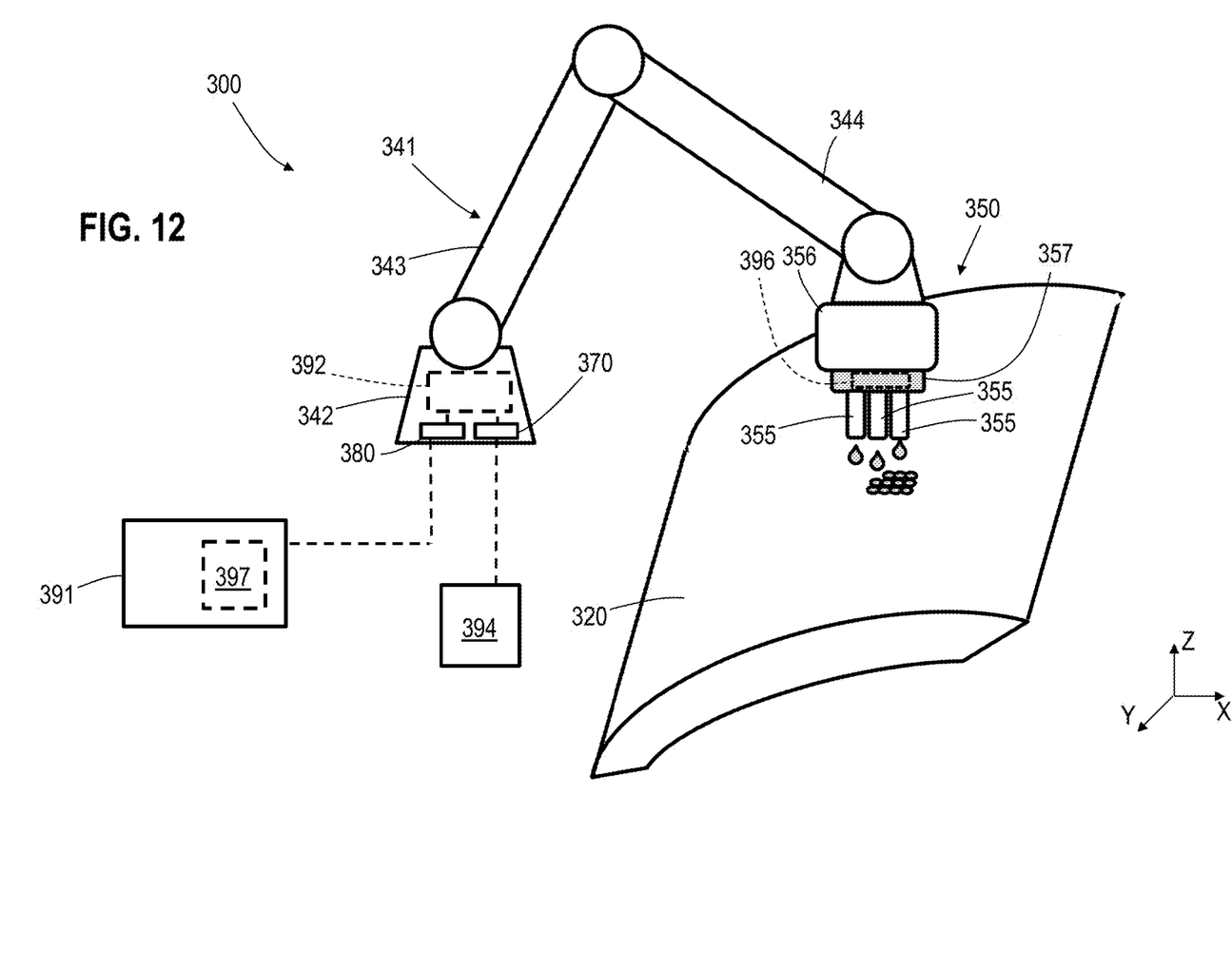
FIG. 12 illustrates an EWOD apparatus according to yet another embodiment, the EWOD apparatus including a metal 3D printer with a 6 DOF robotic arm, a cluster of nozzles, and a platform that may be planar or non-planar.

The printing system 300 of FIG. 12 is similar to the printing system 200 except as otherwise described. Similar elements are described with similar reference numerals incremented by 100. The robotic arm 341 is similar to the robotic arm of FIG. 11, though the printer head assembly 350 is modified relative to the printer head assembly 250 to incorporate multiple nozzles 355 positioned in a cluster that are configured to simultaneously (or in other embodiments, consecutively) generate droplets on demand by EWOD. Additionally, the height of each nozzle 355 may be adjustable, either during initial setup of the printing system 300 (i.e., prior to use) or during droplet generation (i.e., during use).

Figure 13:
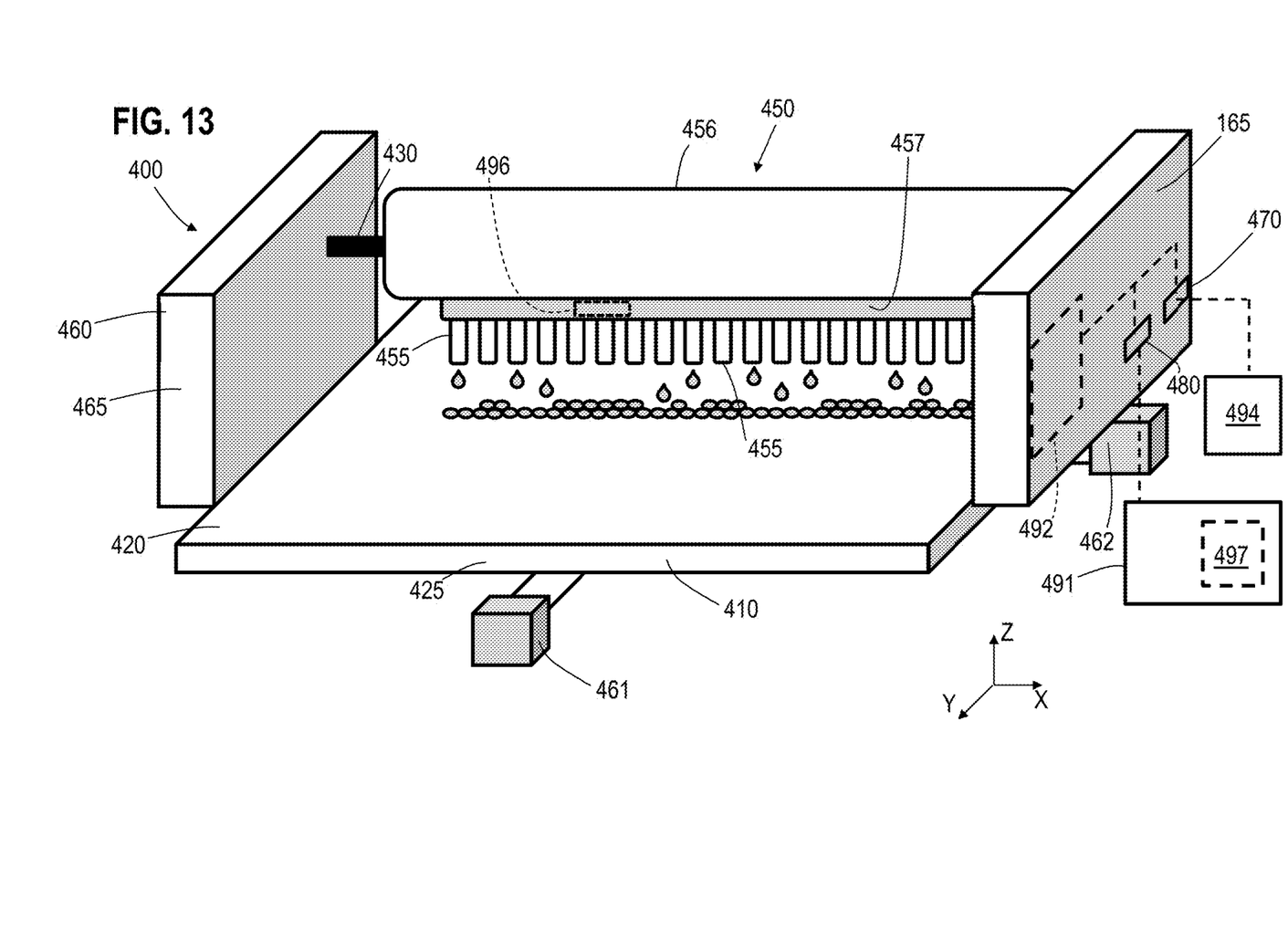
FIG. 13 illustrates an EWOD apparatus according to yet another embodiment, the EWOD apparatus including a metal 3D printer having a cluster of nozzles, a platform, and position controllers on the nozzle cluster and the platform.

The printing system 400 of FIG. 13 is similar to the printing system 100 except as otherwise described. Similar elements are described with similar reference numerals incremented by 300. Rather than incorporating a single nozzle, the printer head assembly 450 of FIG. 13 includes a plurality of nozzles 455 that each receive the liquid metal material from a larger container 456 (or in other embodiments, multiple smaller containers). In some embodiments, the plurality of nozzles 455 are arranged linearly adjacent one another (e.g., along the x-axis, along the y-axis). In other embodiments, the plurality of nozzles 455 may be grouped or bunched together. The substrate 420 is driven by motors 461, 462 (e.g., stepper motors) along multiple axes relative to the printer head assembly 450. In some embodiments, the plurality of nozzles 455 span substantially the full width (e.g., along the x-axis) of the substrate 420 such that the substrate 420 requires only small movements (i.e., no larger than the distance between adjacent nozzles 455) along the x-axis.

Each of the printing systems 200, 300, 400 are configured to connect to a power supply (similar to the power supply 194 shown in FIG. 10) and to a computer (similar to the computer 191 shown in FIG. 10) for power and data transfer, respectively. Each of the printing systems further includes a device controller (similar to the device controller 192 shown in FIG. 10) that controls operation of the respective printing system 200, 300, 400 and a print head assembly controller (similar to the para head assembly controller 196 shown in FIG. 10) for controlling operation of the print head assembly 250, 350, 450. In some embodiments, the controllers 192, 196 are separate electronic controllers and in other embodiments, the controllers 192, 196 are a single electronic controller.

In addition to the advantages listed above, the droplet generation method and apparatus also results in the following advantages over prior art apparatuses. The drop-on-demand MAM system can be utilized on planar and non-planar surfaces alike. Additionally, the system can generate heterogeneous structures based on multiple different liquid metal materials deposited in a programmable way. The resultant MAM system can operate as a voxel-based multi-material machine to create heterogeneous functionally graded material (FGM) structures with predefined functional behavior. Further still, the relatively simple design increases the ease of scaling the size of the droplet generator up or down.

In some embodiments, a kit is formed for retrofitting existing MAM systems. For example, a kit includes a nozzle configured to eject the droplet of the liquid metal material, the nozzle including a conductive solid. The kit also includes a voltage source configured to apply voltage between the conductive solid and the liquid metal material to modify a contact angle between an inner wall of the nozzle and the liquid metal material within the nozzle. The kit also includes a controller configured to modify the voltage from the voltage source to modify the contact angle and generate the droplet of the liquid metal material.

All statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Various other components may be included and called upon for providing for aspects of the teachings herein. For example, additional materials, combinations of materials and/or omission of materials may be used to provide for added embodiments that are within the scope of the teachings herein. Adequacy of any particular element for practice of the teachings herein is to be judged from the perspective of a designer, manufacturer, seller, user, system operator or other similarly interested party, and such limitations are to be perceived according to the standards of the interested party.

In the disclosure hereof any element expressed as a means for performing a specified function is intended to encompass any way of performing that function including, for example, a) a combination of circuit elements and associated hardware which perform that function or b) software in any form, including, therefore, firmware, microcode or the like as set forth herein, combined with appropriate circuitry for executing that software to perform the function. Applicants thus regard any means which can provide those functionalities as equivalent to those shown herein. No functional language used in claims appended herein is to be construed as invoking 35 U.S.C. § 112(f) interpretations as "means-plus-function" language unless specifically expressed as such by use of the words "means for" or "steps for" within the respective claim.

When introducing elements of the present invention or the embodiment(s) thereof, the articles "a," "an," and "the" are intended to mean that there are one or more of the elements. Similarly, the adjective "another," when used to introduce an element, is intended to mean one or more elements. The terms "including" and "having" are intended to be inclusive such that there may be additional elements other than the listed elements. The term "exemplary" is not intended to be construed as a superlative example but merely one of many possible examples.

What is claimed is:

1. A computer-based system for generating a droplet of a liquid metal material in a metal additive manufacturing process, the computer-based system comprising:
    an electronic controller configured to
        maintain the liquid metal material within a nozzle at a stable contact angle; and
        modify the contact angle between an inner wall of the nozzle and the liquid metal material within the nozzle to move the liquid metal material out of the nozzle and generate the droplet of liquid metal material,
        wherein the electronic controller is configured to increase the contact angle to decrease the wettability of the inner wall of the nozzle and release the droplet from the nozzle.

2. The computer-based system of claim 1, wherein the nozzle comprises a conductive solid, and wherein the inner wall of the nozzle is coated with a thin layer of a dielectric material such that the dielectric material is located between the conductive solid and the liquid metal material.

3. The computer-based system of claim 1, wherein the liquid metal material is one of mercury, aluminum, or an aluminum alloy.

4. The computer-based system of claim 1, wherein the electronic controller is configured to decrease the contact angle to increase the amount of liquid metal that is moved out of the nozzle.

5. The computer-based system of claim 1, wherein the electronic controller is configured to firstly decrease the contact angle to increase the amount of liquid metal that is moved out of the nozzle and then secondly increase the contact angle to decrease the wettability of the inner wall of the nozzle and release the droplet from the nozzle.

6. The computer-based system of claim 5, wherein the electronic controller is configured to, after increasing the contact angle to decrease the wettability of the inner wall of the nozzle and release the droplet from the nozzle, decrease the contact angle to the stable contact angle.

7. The computer-based system of claim 1, wherein the electronic controller is configured to apply voltage between a conductive solid and the liquid metal material in the nozzle.

8. The computer-based system of claim 7, wherein the nozzle is the conductive solid such that the electronic controller is configured to apply voltage between the nozzle and the liquid metal material in the nozzle.

9. The computer-based system of claim 1, wherein the electronic controller is configured to modify the contact angle for a time duration between 0.01-0.20 seconds.

10. The computer-based system of claim 1, wherein the nozzle is a first nozzle of a plurality of nozzles in a cluster of printing heads, wherein the electronic controller is configured to generate the droplet of the first nozzle independent of the remaining plurality of nozzles.

11. The computer-based system of claim 10, wherein the electronic controller is configured to control each of the plurality of nozzles to dispense a different liquid metal material.

12. The computer-based system of claim 1, wherein the system is provided as a kit for retrofit of another system.

13. The computer-based system of claim 12, wherein the kit comprises a voltage source, the nozzle, and one of the electronic controller and a set of machine executable instructions stored on non-transitory machine readable media.

* * * * *